(12) United States Patent
Fredricks et al.

(10) Patent No.: US 12,543,647 B2
(45) Date of Patent: Feb. 10, 2026

(54) FLEX ARM BELT SUPPORT FOR A HEADER OF AN AGRICULTURAL HARVESTER

(71) Applicant: CNH Industrial America LLC, New Holland, PA (US)

(72) Inventors: Eric Fredricks, Davenport, IA (US); Jeffrey Thomas, Gordonville, PA (US); Joseph Russell Woelfling, Landisville, PA (US)

(73) Assignee: CNH Industrial America LLC, New Holland, PA (US)

( * ) Notice: Subject to any disclaimer, the term of this patent is extended or adjusted under 35 U.S.C. 154(b) by 726 days.

(21) Appl. No.: 17/899,206

(22) Filed: Aug. 30, 2022

(65) Prior Publication Data
US 2024/0065163 A1  Feb. 29, 2024

(51) Int. Cl.
*A01D 57/20* (2006.01)
*A01D 41/14* (2006.01)

(52) U.S. Cl.
CPC .............. *A01D 57/20* (2013.01); *A01D 41/14* (2013.01)

(58) Field of Classification Search
CPC ........ B65G 15/60; B65G 39/10; A01D 57/20; A01D 41/14; A01D 61/002; A01D 61/02
See application file for complete search history.

(56) References Cited

U.S. PATENT DOCUMENTS

| | | | |
|---|---|---|---|
| 3,964,588 A * | 6/1976 | Kornylak | B65G 47/766 198/786 |
| 5,044,482 A * | 9/1991 | Kramer | B29C 66/1122 198/843 |
| 7,788,891 B2 | 9/2010 | Puryk et al. | |
| 7,992,372 B1 | 8/2011 | Coers et al. | |

(Continued)

FOREIGN PATENT DOCUMENTS

| | | | |
|---|---|---|---|
| CN | 118977971 A * | 11/2024 | |
| WO | WO-2019023238 A1 * | 1/2019 | A01D 41/14 |

(Continued)

OTHER PUBLICATIONS

Translation of Document WO-2019023238-A1 as retrieved on May 1, 2025.*

(Continued)

*Primary Examiner* — Joseph M Rocca
*Assistant Examiner* — Jose Antonio Martinez
(74) *Attorney, Agent, or Firm* — Buchanan Ingersoll & Rooney PC

(57) ABSTRACT

A header for an agricultural harvester including an endless belt conveyor and a flex arm disposed between upper and lower runs of the endless belt conveyor. The flex arm includes an elongate beam having an upper surface, and a roller extending above the upper surface of the elongate beam for contacting the upper run of the endless belt conveyor. The roller raises the belt conveyor above the upper surface of the elongate beam, thereby minimizing (Continued)

contact between the upper run of the endless belt conveyor and friction reducing bearings situated atop channel supports connected at opposite sides of the elongate beam. The resultant construction minimizes wear, heat and drag on the endless belt conveyor and the friction reducing bearings.

20 Claims, 9 Drawing Sheets

(56) References Cited

U.S. PATENT DOCUMENTS

| | | | | |
|---|---|---|---|---|
| 8,495,855 | B1* | 7/2013 | Conrad | A01D 61/002 |
| | | | | 56/181 |
| 8,695,315 | B2* | 4/2014 | Coon | A01D 41/06 |
| | | | | 56/158 |
| 9,161,492 | B2 | 10/2015 | Fuechtling et al. | |
| 10,292,331 | B2 | 5/2019 | Lauwers et al. | |
| 10,568,265 | B2 | 2/2020 | Augustine et al. | |
| 2004/0173441 | A1* | 9/2004 | Wieting | B65G 17/067 |
| | | | | 198/850 |
| 2007/0204584 | A1 | 9/2007 | Coers et al. | |
| 2014/0041354 | A1 | 2/2014 | Coon et al. | |
| 2014/0059996 | A1 | 3/2014 | Cormier et al. | |
| 2014/0196427 | A1 | 7/2014 | Fuechtling | |
| 2020/0102152 | A1* | 4/2020 | Kulick, III | B65G 19/24 |
| 2021/0144922 | A1 | 5/2021 | Farley et al. | |

FOREIGN PATENT DOCUMENTS

| | | | | |
|---|---|---|---|---|
| WO | WO-2020101855 A1 * | 5/2020 | | A01D 41/14 |
| WO | WO-2020101993 A1 * | 5/2020 | | A01D 41/14 |
| WO | WO-2021019363 A1 * | 2/2021 | | A01D 78/02 |

OTHER PUBLICATIONS

Translation of Document WO-2020101855-A1 as retrieved on May 1, 2025.*
Translation of Document WO-2020101993-A1 as retrieved on May 1, 2025.*
Translation of Document WO-2021019363-A1 as retrieved on May 1, 2025.*
Translation of Document CN-118977971-A as retrieved on May 1, 2025.*
Extended European Search Report and Written Opinion for EP Application No. 23194117.0 dated Feb. 9, 2024 (seven pages).

* cited by examiner

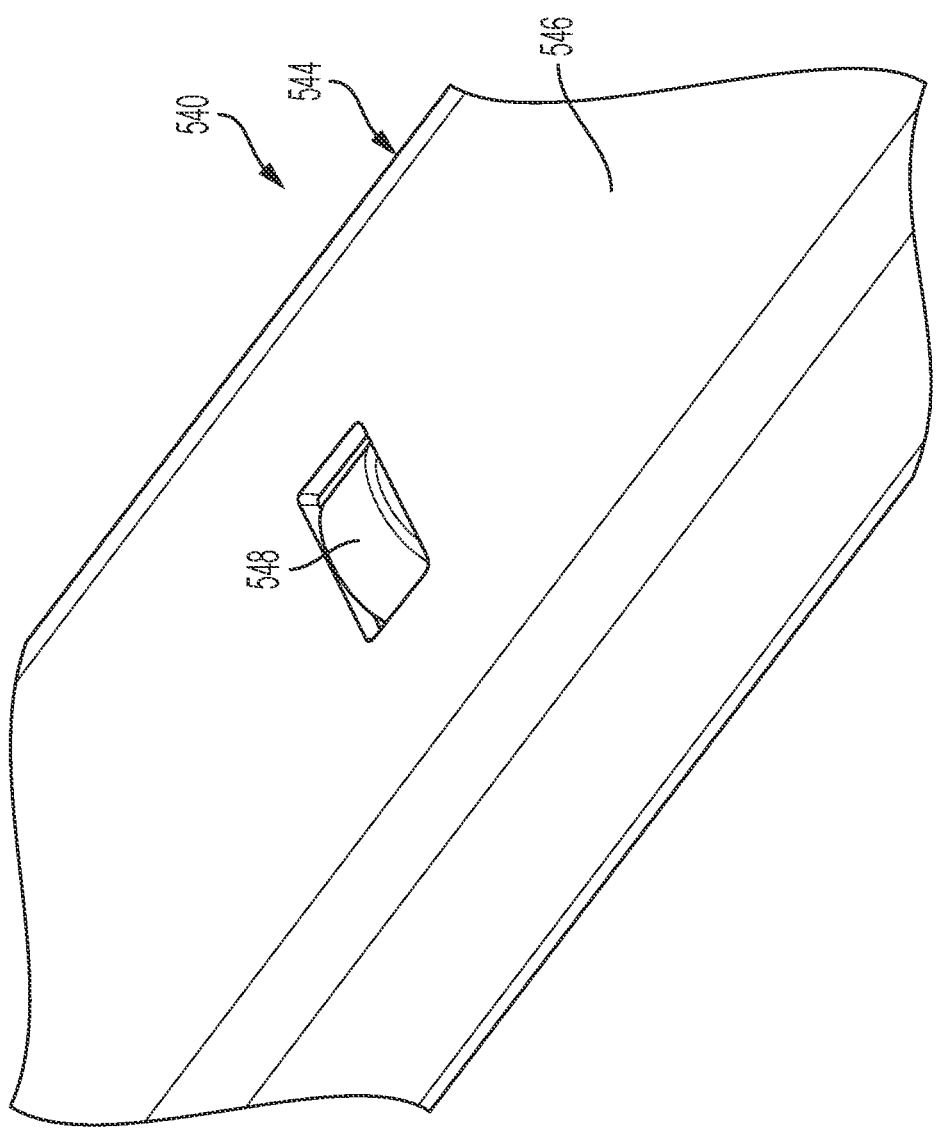

FLEX ARM BELT SUPPORT FOR A HEADER OF AN AGRICULTURAL HARVESTER

The exemplary embodiments of the present invention relate generally to a header of an agricultural harvester having roller-type draper belt supports provided on flex arms of the header.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure. After crops are cut, they flow over crop ramps whereupon they are collected inside the header and transported via a conveyor such as a draper conveyor and/or auger conveyor towards a feederhouse located centrally inside the header.

Conventional agricultural harvester headers often include opposed lateral draper conveyors, i.e., endless belt conveyors, extending widthwise of the header that deliver cut crop to a central draper conveyor extending in the fore and aft direction of the header which delivers cut crop received from the lateral draper conveyors to the feederhouse. Some headers have flex arms pivotably connected to a rear of the header frame or chassis and extending between the upper and lower runs of the draper conveyors. The flex arms may be actuated by hydraulic cylinders or the like to selectively raise and lower portions of the cutter bar thereby flexing the cutter bar in order to cut crops of various heights across the width of the header.

The flex arms are spaced apart widthwise along the header and are pivotably connected along their sides to channel supports or beams that extend in the longitudinal direction of the draper conveyors. The upper surfaces of the channels are oftentimes covered with ultra-high molecular weight polyethylene (UHMWPE) bearings or similar friction-reducing strips that reduce belt wear and drag as the draper conveyor moves over the channels. However, notwithstanding the presence of friction reducing bearings on the channels, it has been observed that when a flex arm is raised in relation to the flex arms on either side of it, the bottom surface of the upper run of the draper belt drives into the leading edges of the friction reducing bearings which creates, heat, drag and wear at these points which, in turn, causes damage to the belt as well as the friction reducing bearings.

SUMMARY OF THE INVENTION

In accordance with an exemplary embodiment, the present disclosure provides a header for an agricultural harvester including an endless belt conveyor and a flex arm disposed between upper and lower runs of the endless belt conveyor. The flex arm includes an elongate beam having an upper surface, and a roller extending above the upper surface of the elongate beam for contacting the upper run of the endless belt conveyor.

According to an aspect, the roller raises the belt conveyor above the upper surface of the elongate beam, thereby minimizing contact between the upper run of the endless belt conveyor and friction reducing strips or bearings situated atop channel supports connected at opposite sides of the elongate beam. The resultant construction minimizes wear, heat and drag on the endless belt conveyor and the friction reducing bearings.

Other features and advantages of the subject disclosure will be apparent from the following more detailed description of the exemplary embodiments.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the subject disclosure, there are shown in the drawings exemplary embodiments. It should be understood, however, that the subject disclosure is not limited to the precise arrangements and instrumentalities shown. In the drawings:

FIG. 5B is a top perspective view of the flex arm of FIG. 5A with the roller protruding from an upper surface of the flex arm;

DETAILED DESCRIPTION OF THE DRAWINGS

Figure 1:
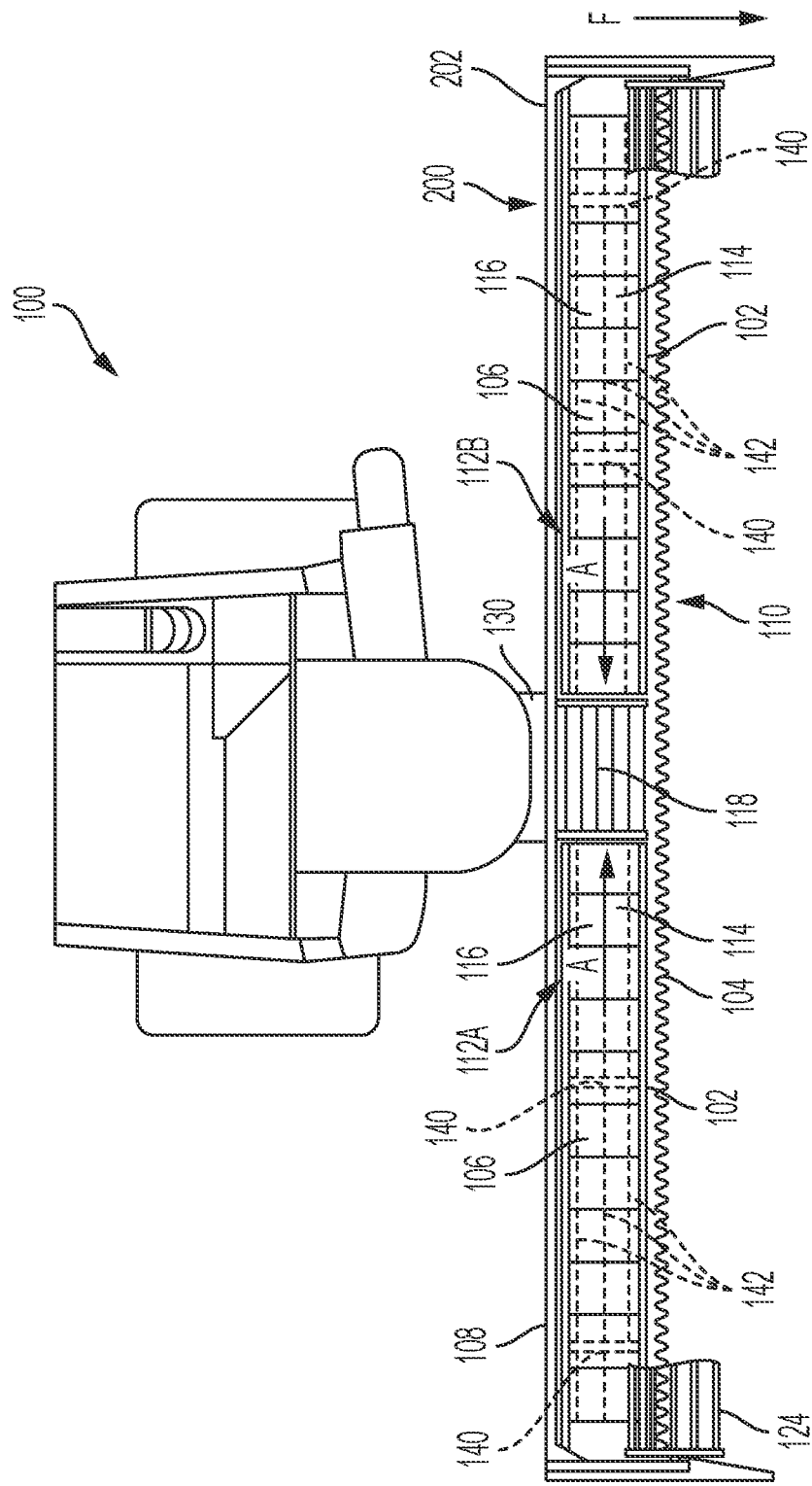
FIG. 1 is a top plan view of an agricultural harvester including a header having flex arms constructed in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Referring to FIG. 1, a representative agricultural harvester 100, which, e.g., may be a combine harvester, is shown. The harvester includes a header 200 incorporating a cut crop barrier interface or crop ramp 102 disposed between an elongate sidewardly extending cutter bar 104 and an elongate, sidewardly extending, endless belt draper conveyor 106 of the header 200.

The header 200 comprises a frame 202, a portion of which is shown extending forwardly from a rear support frame structure 108 to the cutter bar 104. The frame 202 can have a variety of forms, but will generally comprise a chassis-like structure for supporting an elongate sidewardly extending cutter bar assembly 110 comprising the cutter bar 104, as well as at least one elongate sidewardly extending draper assembly 112 comprising the draper conveyor 106, i.e., an endless belt conveyor, and other aspects of the header.

As illustrated, the header 200 includes two draper assemblies 112A, 112B operable for conveying cut crop convergingly to a central conveyor 118, as generally denoted by arrows A, as the harvester moves in a forward direction denoted by arrow F through a field while cutting the crops. The central conveyor 118, in turn, conveys the cut crop into a feederhouse 130 of the harvester 100, which conveys the crop into the harvester for threshing and separation of crop therefrom.

The cutter bar assembly 110 generally includes a sideward, longitudinally extending knife guard having a plurality of forward projecting fingers. A reel 124 extends across the header just above cutter bar assembly 110, and operates to feed the crop to the cutter bar for cutting.

Figure 2:
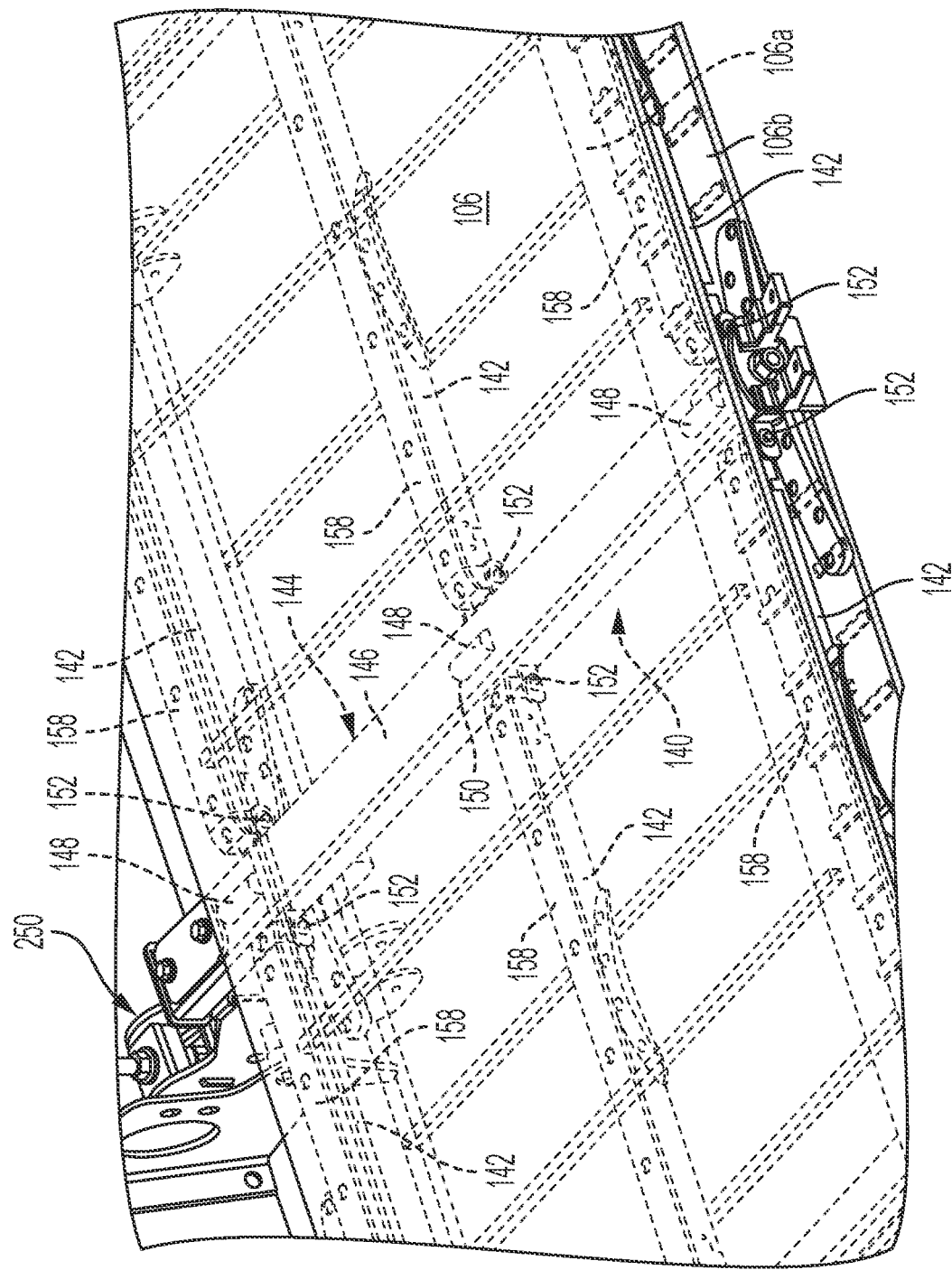
FIG. 2 is an enlarged, perspective view of a portion of the header of FIG. 1.

A plurality of flex arms 140 are situated beneath the upper run of the endless belt draper conveyor 106 and are spaced apart widthwise along the header. As described in greater detail below, the flex arms 140 are connected to a plurality of channel supports 142 that are located at opposite sides of the flex arms. An aft end of each of the flex arms 140 is pivotably mounted to the frame 202 of the header. As shown in FIG. 2, the header further comprises an actuator 250 for pivoting the aft end of an elongate beam 144 of the flex arm and raising and lowering a fore end of the elongate beam. Referring again to FIG. 1, fore ends of the flex arms are connected to the cutter bar 104 such that upward and downward movement of the flex arms causes flexing of the cutter bar in order cut crops of various heights across the width of the header.

Referring to FIG. 2, there is shown the endless belt draper conveyor 106 having upper and lower runs 106a and 106b, respectively. A flex arm 140 is disposed between the upper and lower runs of the endless belt conveyor. According to an exemplary embodiment, the flex arm comprises the elongate beam 144 which has an upper surface 146, and a first exemplary embodiment of a roller 148 extending above the upper surface of the elongate beam for contacting the upper run 106a of the endless belt conveyor. The roller 148 is configured to roll in a direction of movement of the endless belt conveyor 106.

The elongate beam 144 is constructed as a rigid member. The elongate beam incudes a through hole 150 and a portion of the roller extends upwardly through the through hole. According to an aspect, the flex arm 140 comprises a plurality of rollers 148 spaced apart along a length of the elongate beam in order to provide support across the width of the upper run 106a of the endless belt conveyor 106. Although illustrated as having three rollers 148 located generally adjacent channel supports 142, described below, attached to the elongate beam, the flex arm may carry as few as one roller, two rollers, or four or more rollers as may be necessary to adequately support the upper run 106a as it traverses the elongate beam and the ends of the channel supports.

Figure 3:
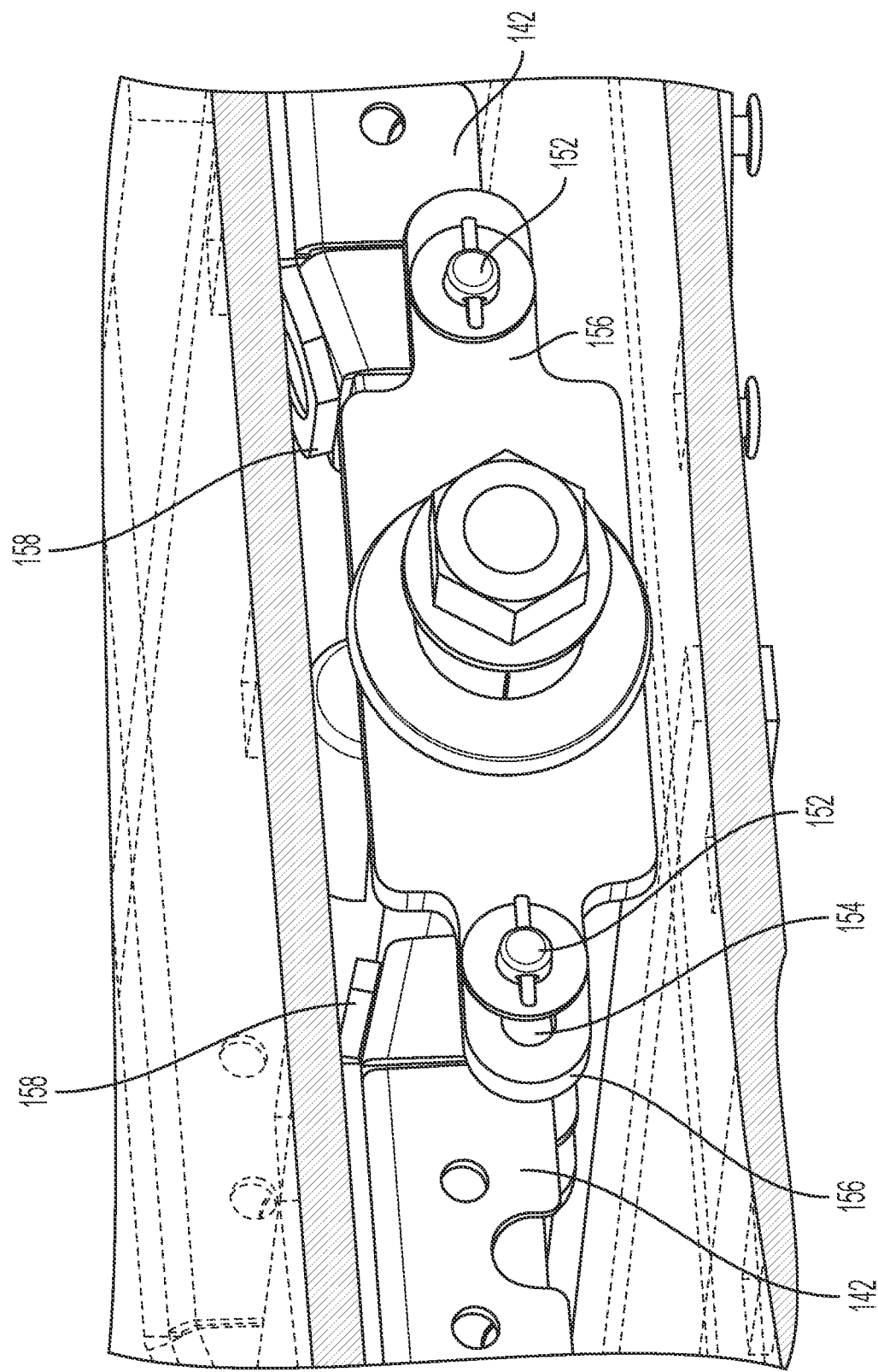
FIG. 3 is an enlarged perspective view of a connection between a flex arm and channel supports of the header of FIG. 1.

As shown in FIGS. 2 and 3, the ends of adjacent channel supports 142 are pitvotably attached to opposite sides of the elongate beam 144. Such pivotable attachment can be achieved by suitable fasteners 152 such as pins, rivets, bolts, or the like, that pass through openings 154 in flanges 156 (FIG. 3) extending laterally from opposite sides of the elongate beam as well as through unillustrated openings provided in the ends of the channel supports 142. Constructed and arranged as such, the channel supports 142 provide support for the upper run 106a of the endless conveyor belt as it moves about a respective draper assembly 112A or 112B. In order to minimize heat and drag as the endless conveyor belt 106 moves along the channel supports 142, each channel support can include a friction reducing strip or bearing 158 along an upper surface thereof. According to an aspect, the friction reducing bearing 158 is a polymeric bearing, e.g., an ultra-high molecular weight polyethylene bearing, or the like, and the roller is desirably positioned adjacent the ultra-high molecular weight polyethylene bearing or between or directly between the channel supports about opposite lateral sides of the elongate beam. Further, in all exemplary embodiments of the subject disclosure, a top surface of the roller is above an uppermost surface of the elongate beam 144 and an uppermost surface of the channel support 142 (including the friction reducing bearing 158).

Figure 4A:
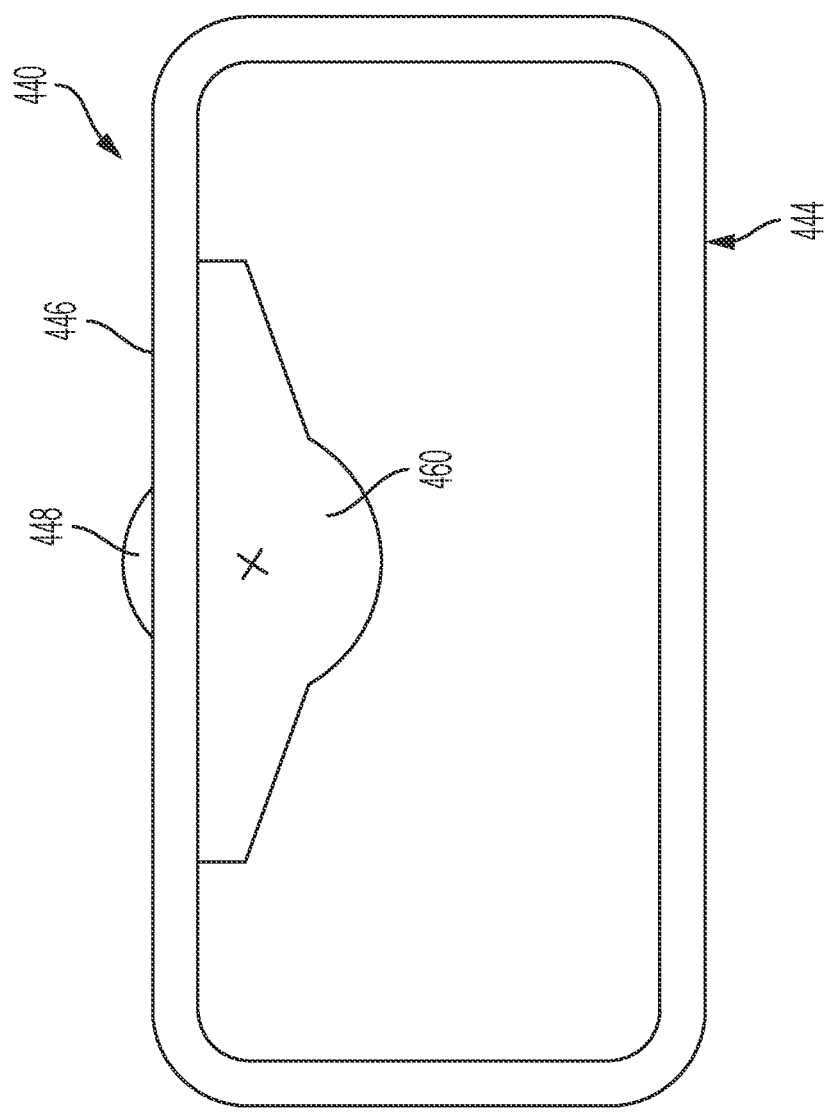
FIG. 4A is an end view of a flex arm showing a connection between a flex arm and a roller in accordance with another exemplary embodiment of the subject disclosure.
Figure 4B:
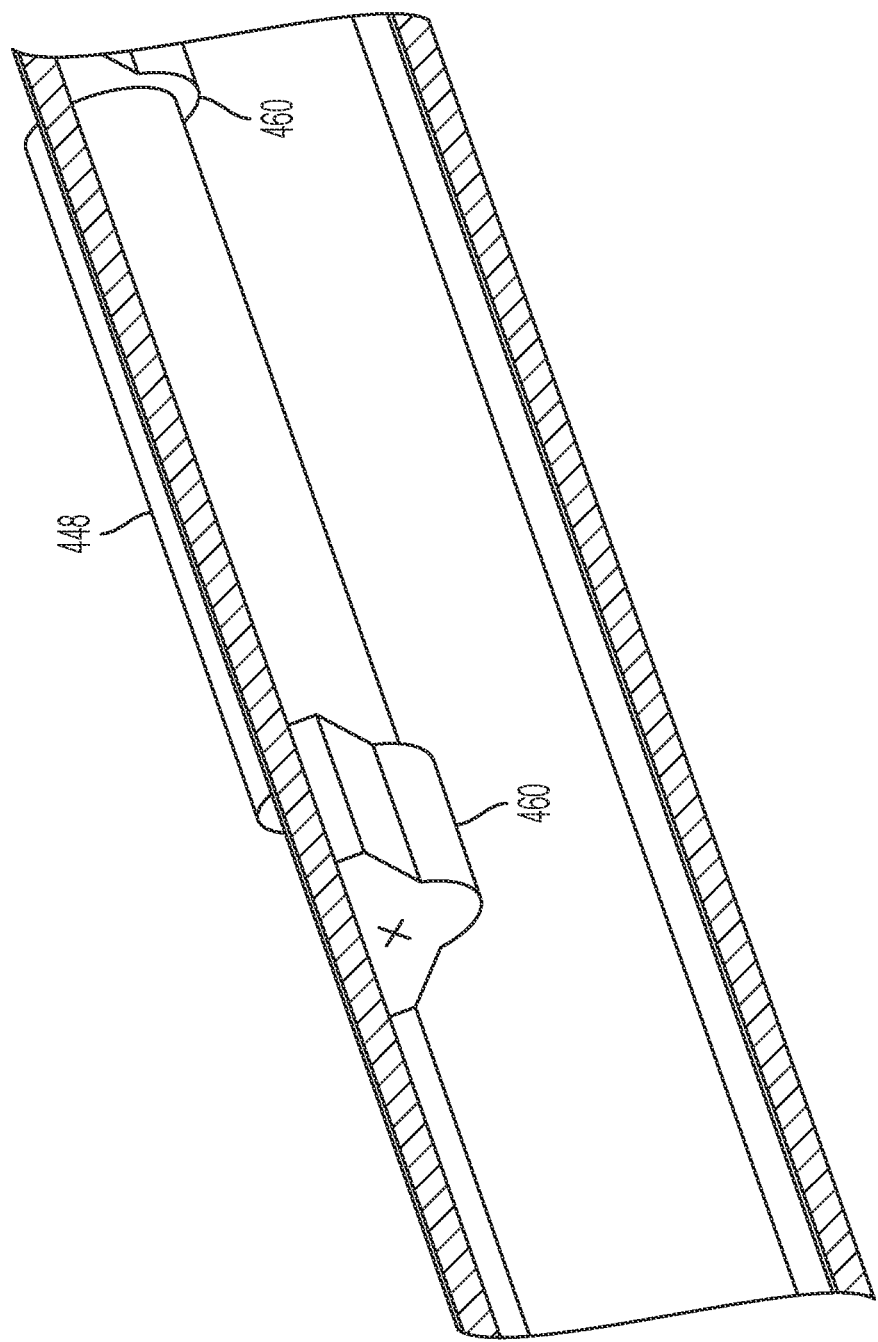
FIG. 4B is a side perspective view of the flex arm of FIG. 4A with a side wall thereof omitted for purposes of illustration.

Referring to FIGS. 4A and 4B, there is shown a connection between a flex arm 440 and another exemplary embodiment of a roller 448. The flex arm 440 comprises an elongate beam 444 configured, e.g., as shown in FIGS. 4A and 4B. The elongate beam may be constructed as an elongated plate or, as illustrated, a hollow elongated member. The roller 448 extends above an upper surface 446 of the elongate beam for contacting the upper run, e.g., 106a, of an endless belt conveyor. The elongate beam comprises a support 460 for rotatably supporting the roller 448. As illustrated, the support may be constructed as a pair of pillow block-like supports located beneath the upper surface of the elongate beam at opposite ends of the roller, whereby an axis "X" of rotation of the roller is below the upper surface of the elongate beam.

Figure 5A:
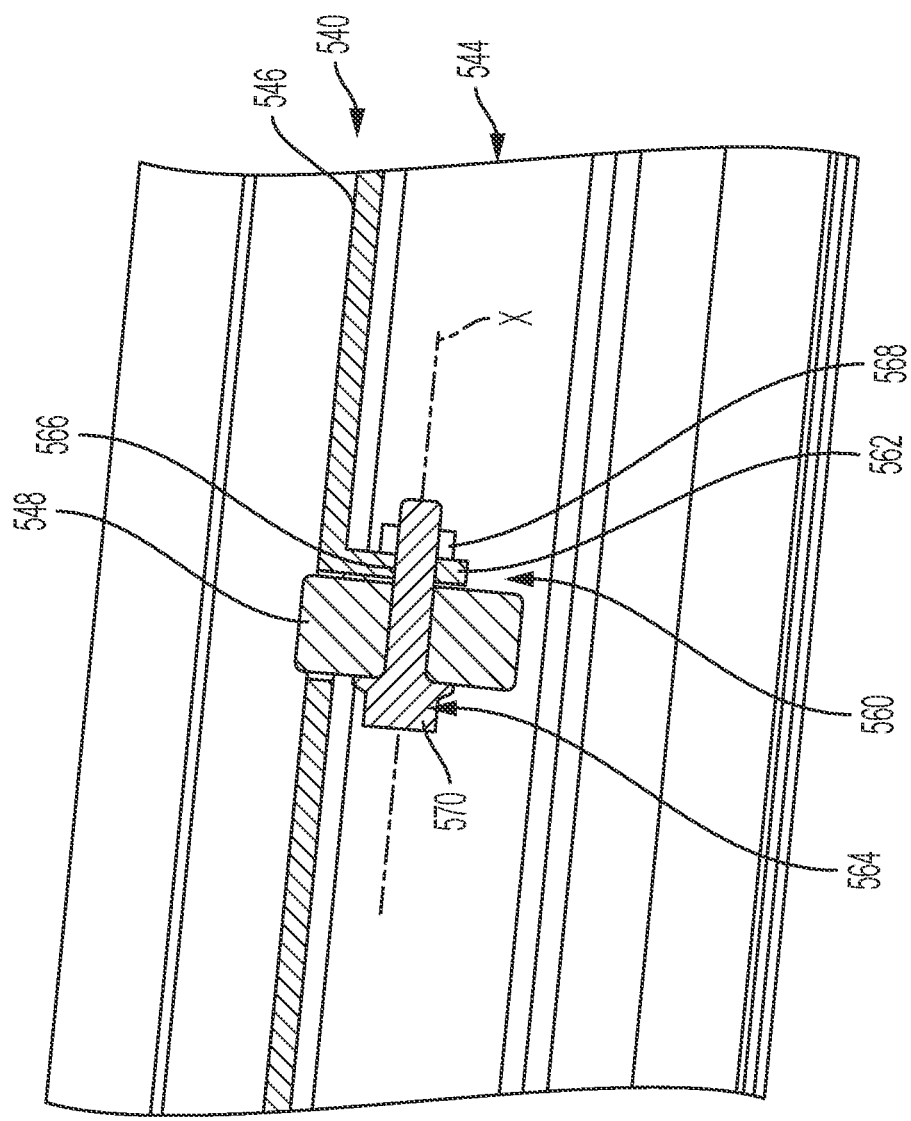
FIG. 5A is a side perspective view of a flex arm with a side wall thereof omitted for purposes of illustration showing in cross section a connection between a flex arm and a roller in accordance with another exemplary embodiment of the subject disclosure.

Referring to FIGS. 5A and 5B, there is shown a connection between a flex arm 540 and another exemplary embodiment of a roller 548. The flex arm 540 comprises an elongate beam 544. The elongate beam may be constructed as an elongated plate or, as illustrated, a hollow elongated member. The roller 548 extends above an upper surface 546 of the elongate beam for contacting the upper run, e.g., 106a, of an endless belt conveyor. The elongate beam comprises a support 560 for rotatably supporting the roller 548. As illustrated, the support 560 may comprise a downwardly directed flange 562 located beneath an upper surface of the elongate beam. The flange may be welded or otherwise fixedly secured to the elongate beam. According to an aspect, the support further comprises a fastener 564 such as a bolt, pin, rivet, or the like, which passes through the roller 548 and an opening 566 in the flange 562 for receiving the fastener 564. If the fastener 564 is a bolt then the flange opening 566 can have internal threading configured to receive the externally threaded shaft of the bolt. Alternatively, the flange opening 566 can be smooth-walled such that the bolt may threadedly engage with a nut 568. In either event, the roller 548 is captured for rotation between an enlarged head 570 of the bolt and the flange 562, whereby an axis "X" of rotation of the roller is below the upper surface of the elongate beam.

Figure 6A:
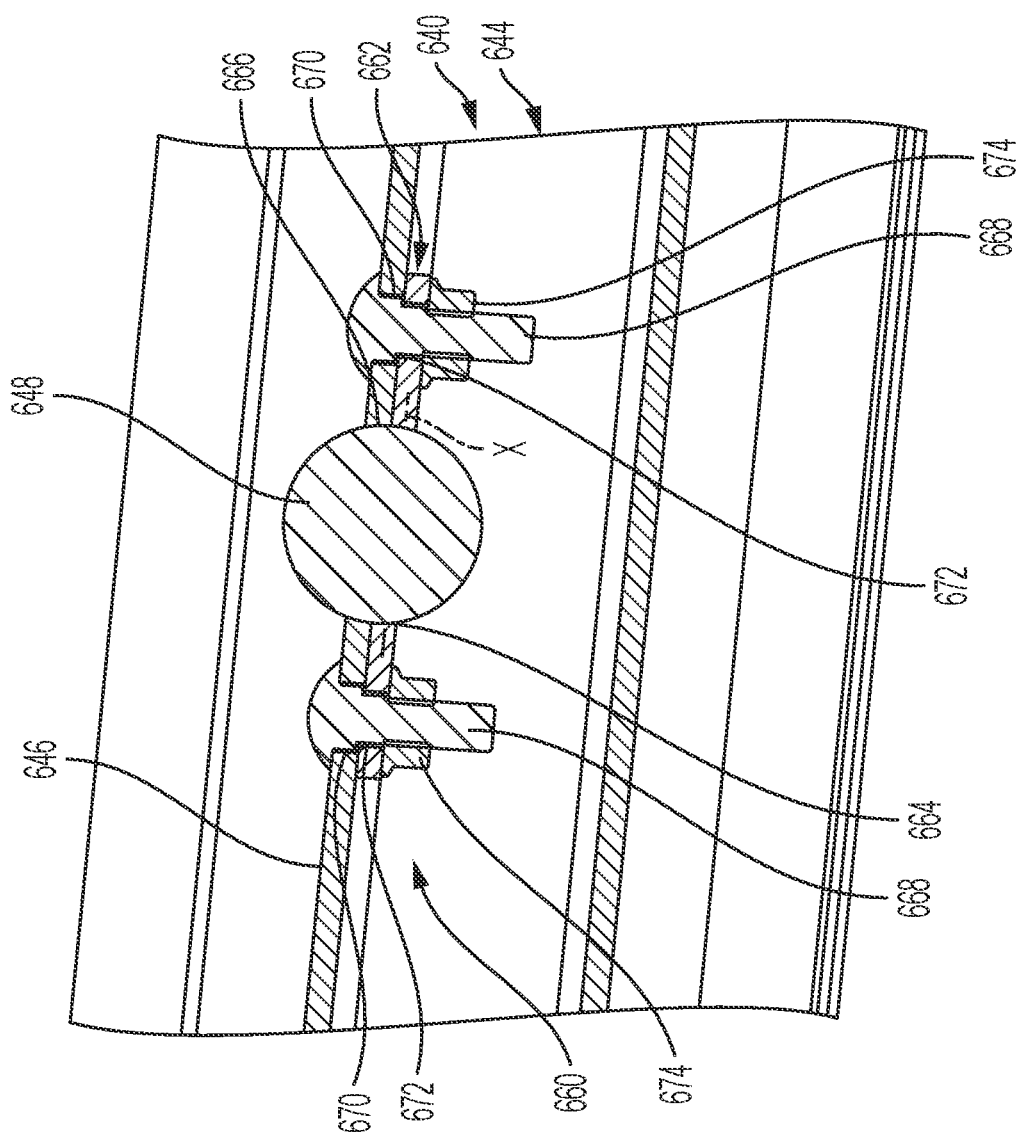
FIG. 6A is a side perspective view of a flex arm with a side wall thereof omitted for purposes of illustration showing in cross section a connection between a flex arm and a roller in accordance with another exemplary embodiment of the subject disclosure.
Figure 6B:
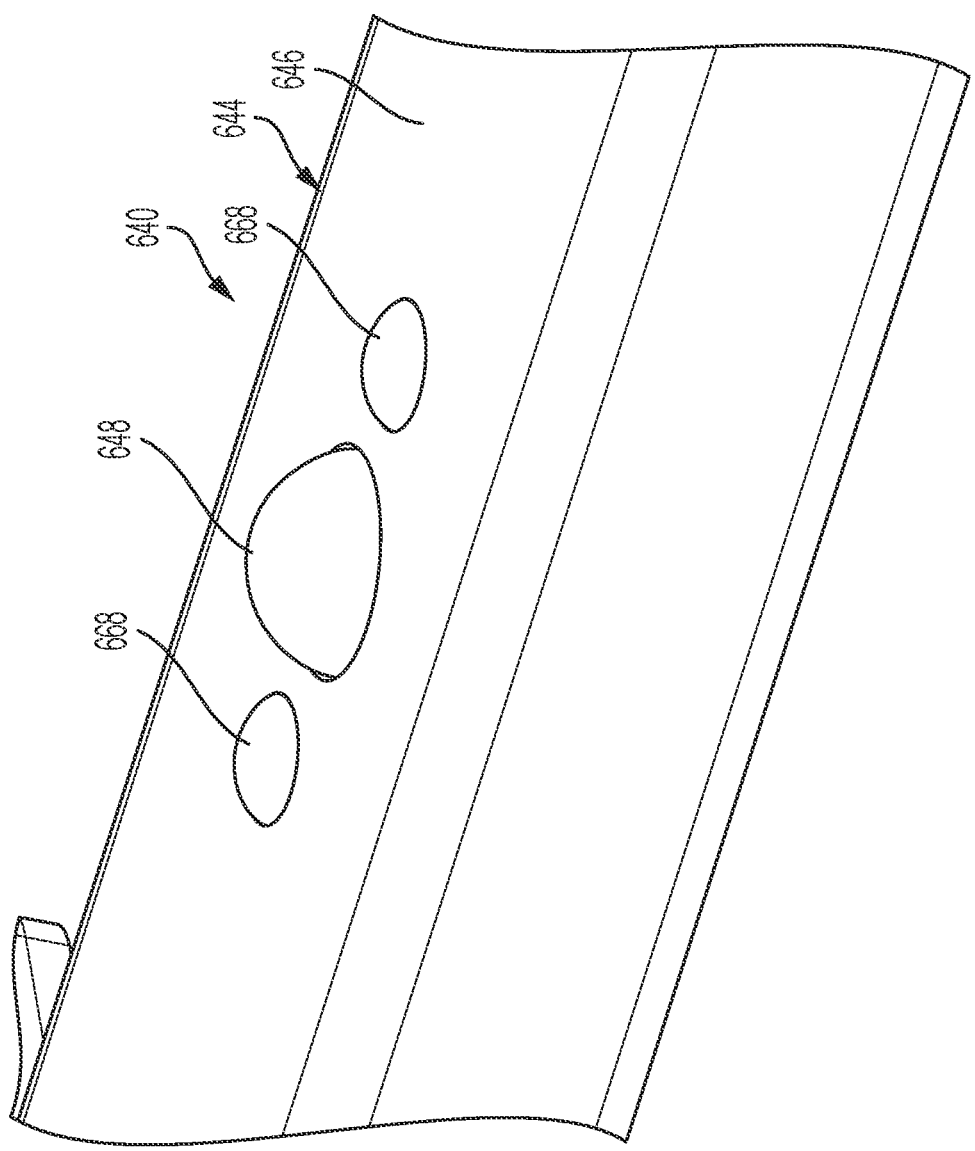
FIG. 6B is a top perspective view of the flex arm of FIG. 6A with the roller protruding from an upper surface of the flex arm.

Referring to FIGS. 6A and 6B, there is shown a connection between a flex arm 640 and another exemplary embodiment of a roller 648. The flex arm 640 comprises an elongate beam 644. The elongate beam may be constructed as an elongated plate or, as illustrated, a hollow elongated member. The roller 648 extends above an upper surface 646 of the elongate beam for contacting the upper run, e.g., 106a, of an endless belt conveyor. According to this exemplary embodiment, the roller 648 is constructed as a ball bearing and preferably includes a plurality of ball bearings spaced apart along the length of the elongate beam 644. The elongate beam comprises a support 660 for rotatably supporting the roller 648. As illustrated, the support 660 may comprise a plate 662 located beneath an upper surface of the elongate beam. The plate 662 is desirably provided with a truncated semispherical surface 664 which cooperates with a corresponding truncated semispherical surface 666 provided in the elongate beam 644 to capture the ball bearing roller 648 therein and permit rolling of the of the ball bearing as the upper run of the endless belt conveyor passes thereover. The support 660 further comprises at least one fastener 668 such as a bolt, pin, rivet, or the like, which passes through an opening 670 in the elongate beam 644 and an opening 672 in the plate 662. According to an aspect, the support comprises a pair of fasteners 668 disposed on opposite sides of the roller 648. If the fastener 668 is a bolt then the shaft of bolt may threadedly engage with a nut 674 to clamp the plate 662 to the elongate beam 644, whereby the ball bearing roller 648 is retained for rolling between the truncated semispherical surfaces 664, 666 of the plate and the elongate beam, whereby an axis "X" of rotation of the roller is below the upper surface 646 of the elongate beam.

In all exemplary embodiments of the subject disclosure, the various rollers described herein may be formed from any suitable durable material such as a metal, e.g., steel, or a polymer, e.g., ultra-high molecular weight polyethylene.

The subject disclosure further contemplates an agricultural harvester comprising a header including an endless belt conveyor and a flex arm disposed between upper and lower runs of the endless belt conveyor. The flex arm includes an elongate beam having an upper surface, and a roller extending above the upper surface of the elongate beam for contacting the upper run of the endless belt conveyor.

It will be appreciated by those skilled in the art that changes could be made to the exemplary embodiments described above without departing from the broad inventive concept thereof. It is to be understood, therefore, that the subject disclosure is not limited to any particular exemplary embodiments disclosed, but it is intended to cover modifications within the spirit and scope of the subject disclosure as defined by the appended claims.

We claim:

1. A header for an agricultural harvester comprising:
   an endless belt conveyor; and
   a flex arm disposed between upper and lower runs of the endless belt conveyor, the flex arm comprising:
   an elongate beam having an upper surface and a hollow interior channel, and
   a roller partially positioned within the hollow interior channel of the elongate beam and partially extending above the upper surface of the elongate beam for contacting the upper run of the endless belt conveyor.

2. The header of claim 1, wherein the flex arm comprises a plurality of rollers spaced apart along a length of the elongate beam.

3. The header of claim 1, wherein the roller rolls in a direction of movement of the endless belt conveyor.

4. The header of claim 1, wherein the roller is a ball bearing.

5. The header of claim 1, wherein the roller comprises ultra-high molecular weight polyethylene.

6. The header of claim 1, wherein the elongate beam comprises a support for rotatably supporting the roller.

7. The header of claim 1, wherein the support is located beneath the upper surface of the elongate beam.

8. The header of claim 1, wherein an aft end of the elongate beam is pivotably mounted to a frame of the header.

9. The header of claim 8, further comprising an actuator for pivoting the aft end of the elongate beam and raising and lowering a fore end of the elongate beam.

10. The header of claim 1, wherein the elongate beam includes a through hole and a portion of the roller extends through the through hole.

11. The header of claim 1, wherein an axis of rotation of the roller is below the upper surface of the elongate beam.

12. The header of claim 1, wherein the roller is adjacent a channel support attached to the elongate beam.

13. The header of claim 12, wherein the flex arm comprises a plurality of flex arms and the channel support extends between adjacent flex arms, wherein the rollers of the flex arms are aligned with a longitudinal axis of the channel support.

14. The header of claim 12, wherein the channel support includes an ultra-high molecular weight polyethylene bearing and the roller is aligned with the ultrahigh molecular weight polyethylene bearing.

15. The header of claim 12, wherein a top surface of the roller is above an uppermost surface of the elongate beam and an uppermost surface of the channel support.

16. An agricultural harvester comprising the header of claim 1.

17. The header of claim 1, wherein the endless belt conveyor is not wound about the roller.

18. The header of claim 1, wherein the roller is mounted to the elongate beam such that the roller is prevented from translating with respect to the elongate beam.

19. The header of claim 1, wherein the elongate beam has a lower surface opposite the upper surface and the hollow interior channel is defined between the lower and upper surfaces.

20. The header of claim 19, wherein an axis of rotation of the roller is defined at a location between the lower and upper surfaces.

* * * * *